US012762259B2

(12) United States Patent
Woo et al.

(10) Patent No.: US 12,762,259 B2
(45) Date of Patent: Oct. 13, 2026

(54) LOCAL DATA PROTECTION SYSTEM

(71) Applicant: NAMUSOFT CO., LTD, Seoul (KR)

(72) Inventors: Jong Hyun Woo, Seoul (KR); Mineui Hong, Incheon (KR); Hyo Dong Kim, Paju-si (KR); Yu Seon Choi, Gwangju-si (KR); Bong Chan Kim, Suwon-si (KR); Sin Ae Kim, Bucheon-si (KR); Young Il Shin, Seoul (KR); Jea Yeon Kim, Hwaseong-si (KR); Jae Choon Cho, Seoul (KR); Sang Yong Kim, Seoul (KR)

(73) Assignee: NAMUSOFT CO., LTD, Seoul (KR)

( * ) Notice: Subject to any disclaimer, the term of this patent is extended or adjusted under 35 U.S.C. 154(b) by 147 days.

(21) Appl. No.: 18/574,320

(22) PCT Filed: Dec. 29, 2022

(86) PCT No.: PCT/KR2022/021577
§ 371 (c)(1),
(2) Date: Dec. 27, 2023

(87) PCT Pub. No.: WO2024/071529
PCT Pub. Date: Apr. 4, 2024

(65) Prior Publication Data

US 2025/0103735 A1 Mar. 27, 2025

(30) Foreign Application Priority Data

Sep. 30, 2022 (KR) ........................ 10-2022-0125004

(51) Int. Cl.
*G06F 21/62* (2013.01)

(52) U.S. Cl.
CPC ................................ *G06F 21/6209* (2013.01)

(58) Field of Classification Search
None
See application file for complete search history.

(56) References Cited

U.S. PATENT DOCUMENTS

| | | | | |
|---|---|---|---|---|
| 2006/0212481 A1* | 9/2006 | Stacey | G06F 16/10 |
| 2010/0024036 A1* | 1/2010 | Morozov | G06F 21/53 726/26 |
| 2016/0147722 A1* | 5/2016 | Hariharan | G06F 40/166 715/255 |

FOREIGN PATENT DOCUMENTS

| | | | |
|---|---|---|---|
| KR | 10-2009-0128818 A | 12/2009 | |
| KR | 10-2013-0079004 A | 7/2013 | |
| KR | 10-2014-0024664 A | 3/2014 | |
| KR | 10-2022-0097037 A * | 7/2022 | G06F 16/176 |
| KR | 10-2022-0097109 A | 7/2022 | |

OTHER PUBLICATIONS

International Search Report of PCT/KR2022/021577 mailed Jun. 16, 2023 from Korean Intellectual Property Office.

* cited by examiner

*Primary Examiner* — William J. Goodchild
(74) *Attorney, Agent, or Firm* — PnK IP LLC

(57) ABSTRACT

According to one aspect of the present invention, there is provided a local data protection system including a data protection agent program installed on a local computing device, which, in accordance with a preset security policy, directs storage of data files stored on the local computing device to a security area, and performs predetermined data protection functions to prevent data in storage from being leaked, lost, stolen or otherwise compromised.

3 Claims, 2 Drawing Sheets

【FIG. 1】
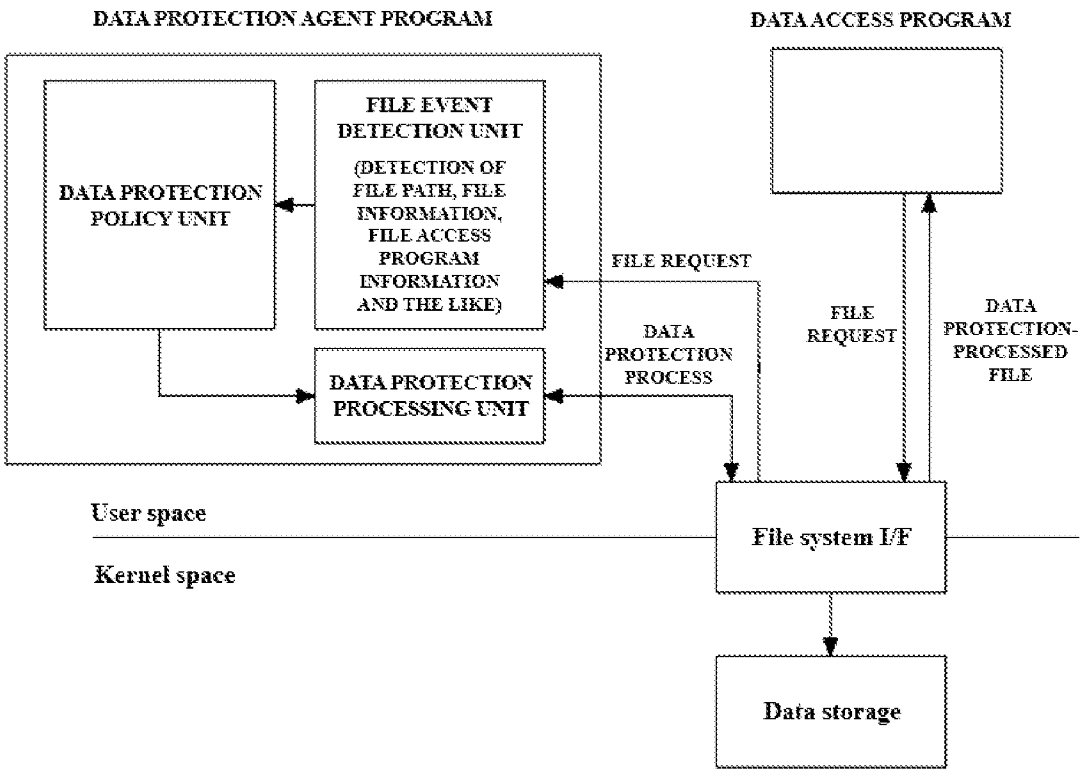

【FIG. 2】
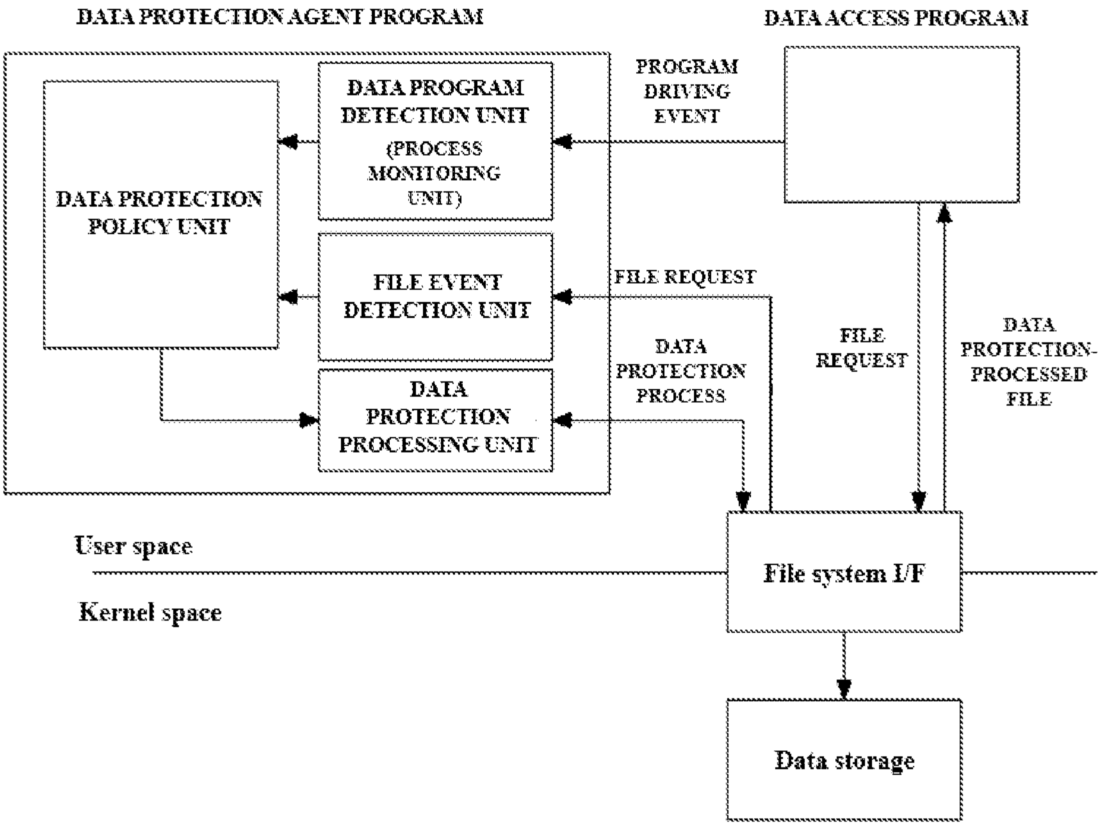

LOCAL DATA PROTECTION SYSTEM

TECHNICAL FIELD

The present invention relates to a local data protection system having data storage guidance (inducement) and data breach (theft)/leakage prevention functions for data stored within a local computing device used by a user, such as a PC or laptop.

BACKGROUND ART OF THE INVENTION

Traditional data protection is performed on endpoint devices (e.g., user PCs) using software antivirus, etc. or on the network using firewalls, which require large computing power and have the problem of poor security accuracy.

A technology that protects data in a manner other than the aforementioned end-point protection or network protection by protecting data in storage, thereby minimizing the computing power required for data protection while improving security accuracy, is referred to as storage protection.

These storage protection technologies may be used for a variety of data protection purposes, from data loss prevention due to malware such as ransom ware, to data breach prevention due to phishing, and to data leak prevention due to insiders.

DETAILED DESCRIPTION OF THE INVENTION

Technical Subject

The present invention is to provide a local data protection system, operatively implemented on a local computing device that can guide (induce) storage locations for data files stored on the local computing device in accordance with a security policy and prevent data leakage, loss, theft, and the like.

Technical Solution

According to one aspect of the present invention, there may be provided a local data protection system including a data protection agent program installed on a local computing device, which, in accordance with a preset security policy, guides a legitimate user to restrict the storage location of data files stored on the local computing device to only a safe and secure area, and performs predetermined data protection functions to prevent data leakage, loss, theft, and the like by cyberattacks.

Advantageous Effects

According to an exemplary embodiment of the present invention, a local data protection system operatively implemented on a local computing device has the effect of preventing data leakage, loss, theft and the like by cyberattacks while guiding the storage location at the file system level so that data files stored on the local computing device are stored only in a safe and secure area by a legitimate user in accordance with a security policy.

BRIEF DESCRIPTION OF DRAWINGS

FIG. 1 is a reference drawing for illustrating a data protection agent program of a local data protection system according to a first exemplary embodiment of the present invention.

FIG. 2 is a reference drawing for illustrating a data protection agent program of a local data protection system according to a second exemplary embodiment of the present invention.

MODES FOR INVENTION

The present invention is subject to various modifications and may have many embodiments, certain of which are to be illustrated in the drawings and described in detail in the accompanying description. However, this is not intended to limit the invention to any particular embodiment and is to be understood to include all modifications, equivalents or substitutions that fall within the scope of the idea and technology of the invention.

In describing the invention, detailed descriptions of related prior art are omitted where it is determined that such descriptions would unnecessarily obscure the gist of the invention. Furthermore, numbers (e.g., first, second, etc.) used in the course of the description herein are merely identifiers to distinguish one component from another.

Furthermore, throughout the specification, when a component is referred to as being “connected” or “coupled” to another component, it is to be understood that the component is or may be directly connected or coupled to the other component, but may also be connected or coupled through the intermediary of another component, unless otherwise indicated. Furthermore, throughout the specification, when a part is the to “include” another component, it is to be understood that the part may further include other components, not exclude other components, unless otherwise indicated. In addition, the terms “part,” “module,” and the like as used in the specification mean a unit that handles at least one function or operation, which may be implemented in one or more pieces of hardware or software or a combination of hardware and software.

A local data protection system according to the present invention includes a data protection agent program installed on a local computing device such as a PC, laptop, or the like used by a user to guide storage locations for data files stored on the local computing device in accordance with a preset security policy, and to perform predetermined data protection functions to prevent data leakage, loss, theft, and the like. In a local data protection system according to an exemplary embodiment of the present invention, the data protection agent program may be configured as shown in FIG. 1 or FIG. 2.

In an exemplary embodiment of the present invention, the data protection agent program may be implemented by comprising: a file event detection unit that detects a file open event occurring on the local computing device: a security program detection unit that monitors processes by various data access programs executed on the local computing device to detect whether the executed data access program is a security program predetermined by a data protection policy unit; and a data protection processing unit that performs data protection processing in accordance with a data protection policy set by the data protection policy unit.

The following describes in detail the functions and roles performed by the data protection agent program for the implementation of a local data protection system according to embodiments of the present invention. The following descriptions are all operations executed by the data protection agent program.

[Case 1_Data Storage Inducement Function]

The first case is a local data protection system implemented by responding to a file event about a file of a specific extension designated as a security target in accordance with the conditions of the archived (pre-stored) file area and the accessing program.

Security Program & Security Storage Area

According to an exemplary embodiment, the data protection agent program may, in response to a request to open a file stored on the local computing device having an extension designated as a security target according to the security policy, provide a user with a real file with read/write file attributes that can be read and written, if the requested program is designated as a secure program according to the security policy, and if the requested file is a file stored in a security storage area of the local computing device.

In this case, the creation of new files by the security program may be permitted, regardless of whether or not they have a security targeted extension.

Security Programs & Non-Security Storage Areas

Notwithstanding the above, the data protection agent program may, in response to a request to open a file stored on the local computing device having an extension designated as secure under the security policy, provide a genuine, read-only, read-only file in response to the request to open the file, if the requested program is designated as a security program under the security policy, and if the requested file is a file stored in an unsecured storage area of the local computing device. In this case, if an attempt is made to store (save) the file, it will only be possible to store (save) it under a new name for the designated (specific) extension because it is in a read-only state.

In addition, in this case, the creation of new files by the security program is allowed only for extensions that are not designated as security targets (hereinafter referred to as non-designated extensions), i.e., the creation of new files to non-security storage areas for security target extensions is not allowed.

In the first case described above, in the case of a file opening request by a file browsing program (e.g., Windows Explorer) provided by the operating system (OS) of the local computing device, a readable and writable real file can always be provided to the user.

Furthermore, in the first case described above, in the case of a request to open a file with an unspecified (non-designated) extension, a readable and writable real file may be provided to the user regardless of whether it is in a security storage area or a non-security storage area.

[Case 2_Preventive Functions of Data Theft and Loss]

The second case is also a data protection system implemented by responding to file events related to files with extensions designated as security targets, depending on the area of the archived file and the conditions of the accessing program.

Security Programs & Security Storage Areas

According to an exemplary embodiment, the data protection agent program may provide (return) a readable and writable real file in response to a request to open a file stored on the local computing device having an extension designated as secure in accordance with the security policy, provided that the open requested program is designated as a security program in accordance with the security policy, provided that the open requested file is a file stored in a security storage area of the local computing device.

In this case, the creation of new files by the security program may be permitted, regardless of whether they have a security targeted extension.

Furthermore, in this case, in the case of a file opening request by a file browsing program (e.g., Windows Explorer) provided by the operating system (OS) of the local computing device, a real file that is readable and writable may always be provided to the user.

In this case, a real file that is readable and writable may also be provided by a security program in response to a request to open a file in a security storage area with an unspecified (non-designated) extension.

Security Programs & Non-Security Storage Areas

According to an exemplary embodiment, the data protection agent program may provide a genuine file with a read-only file attribute if there is a request to open a file stored on the local computing device having an extension designated as secure according to the security policy, if the open requested program is designated as a secure program according to the security policy, and if the open requested file is a file stored on a non-security storage area of the local computing device.

In this case, if an attempt is made to store (save) the file, it will be read-only and can only be stored (saved) under a new name for the designated (specified) extension.

Furthermore, in this case, in the case of a file opening request by a file browsing program (e.g., Windows Explorer) provided by the operating system (OS) of the local computing device, a real file that is readable and writable can always be provided to the user.

Furthermore, in this case, the creation of new files by the security program is permitted only for extensions that are not designated as security targets (hereinafter referred to as non-designated extensions), i.e., the creation of new files to non-security storage areas for security target extensions is not permitted.

In addition, in this case, the security program can provide a real file that can be read and written, even if there is a request to open a file in the non-security storage area with a non-designated (unspecified) extension.

Non-Security Programs & Security Storage Areas

Furthermore, according to an exemplary embodiment, the data protection agent program may, in case of an open request for a file stored on the local computing device having an extension designated as secure according to the security policy, generate and provide in real time a fake file of read-only file attribute that is readable even if the open requested file is a file stored in a secure storage area of the local computing device, if the open requested file is a program that is not designated as a secure program. Here, the fake file may be a file having the same file size as the original of the file requested to be opened, but having a file filled with null values or meaningless values.

Even in the prior art, there are technologies that provide fake files for data protection (e.g., IBM's Decoy FS (file system)). However, when providing a fake file in a readable/writable state, there is a problem that it is impossible to prevent malware from tampering with existing files (i.e., original files) in the storage path of the fake file by encrypting and storing the data in the fake file. As a result, to solve this problem of tampering with original files, the above-described Decoy FS system is configured to store the original files separately in a separate storage space (i.e., a separate file system) from the fake files. In contrast, in the embodiment of the present invention, when providing a fake file rather than an original file, a fake file with a read-only attribute is generated and provided in real time, so that the problem of tampering with the original file does not occur within a single file system (i.e., without separating the storage space as described above).

Non-Security Programs & Non-Security Storage Areas

Furthermore, according to an exemplary embodiment, the data protection agent program may generate and provide in real-time a fake file with read-only file attributes that can be read by the data protection agent program in the event of an open request for a file stored on the local computing device having an extension designated as secure under the security policy, if the open request is for a program that is not designated as a secure program, and if the open request is for a file stored in an unsecured storage area of the local computing device.

In the above-mentioned cases, the creation of new files by non-security programs is outside the scope of control of the present invention, i.e., the creation of new files may be allowed regardless of whether they have a security or non-security extension. Conversely, depending on the security policy, the creation of new files by non-security programs may be blocked altogether.

In addition, according to an exemplary embodiment, when a non-security program receives an open request for a file with a non-designated extension, it can provide a real file that can be read and written to.

[Case 3_Data Leakage (Insider Leakage) Prevention Function]

The above third case is predicated on the execution, via the data protection agent program, of a function that prohibits the creation, modification or deletion of executable files of a security program running on the local computing device (e.g., prohibits the modification, creation or deletion of word.exe of an executable file of a specified security program). The reason for this is to prevent malware or insiders from modifying the executable file of a non-secure program (e.g., FTP.exe) into the executable file of a secure program (e.g., word.exe) in order to exfiltrate data.

Furthermore, the third case above is predicated on implementation of the document centralization-file copy direction control (i.e., files cannot be copied from a secure storage area to a non-secure storage area, but files can be copied from a non-secure storage area to a secure storage area), clipboard control (i.e., content copied to the clipboard by a secure program cannot be pasted into the body of a non-secure program, content copied to the clipboard by a non-secure program can be pasted into the body of a secure program), output control function (the secure program can only output documents in the secure area), and network control function (i.e., when a secure program is selected as the top of a window, it can only communicate with the network IPs allowed for that secure program).

Security Programs & Security Storage Areas

According to an exemplary embodiment, the data protection agent program may provide a readable and writable real file in response to a request to open a file stored on the local computing device having an extension designated as secure in accordance with the security policy, if the requested program is designated as a secure program in accordance with the security policy, and if the requested file is a file stored in a secure storage area of the local computing device.

In this case, the creation of new files by the secure program is permitted, regardless of whether they have extensions designated as secure.

In addition, in this case, in the case of a file opening request by a file browsing program (e.g., Windows Explorer) provided by the operating system (OS) of the local computing device, a real file that is always readable and writable may be provided to the user.

However, the read and write locations must be within a security storage area, or if the read location is a security storage area and the write location is an non-security storage area, a read-only fake file must be provided. In this case, when a read-only fake file is created, a window warning can be automatically displayed so that the user is aware of it. Conversely, if the read location is a non-security storage area and the write location is a security storage area, a real file must be provided that can be read and written to.

Security Programs & Non-Security Storage Areas

Furthermore, according to an exemplary embodiment, the data protection agent program may provide a genuine file with a read-only file attribute that can only be read if there is a request to open a file stored on the local computing device that has an extension designated as secure according to the security policy, wherein the requested program is designated as a secure program according to the security policy, and wherein the requested file is a file stored in a non-secure storage area of the local computing device. In such a case, if the secure program attempts to store (save) the file, it can only save it under a new name for the designated extension, and will attempt to create it under a new name, which will be blocked if the secure program attempts to create a file with a security target extension in the non-security area.

Furthermore, in this case, the creation of new files by the security program is permitted only for extensions that are not designated as security targets (hereinafter referred to as non-designated extensions), i.e., the creation of new files to the non-security storage area for the security target extensions is not permitted.

In addition, in this case, in the case of a file opening request by a file browsing program (e.g., Windows Explorer) provided by the operating system (OS) of the local computing device, a real file that is always readable and writable can be provided to the user.

Non-Security Programs & Security Storage Areas

Further, in an exemplary embodiment, the data protection agent program may, in response to a request to open a file stored on the local computing device having an extension designated as secure under the security policy, generate and provide in real time a read-only fake file that is readable even if the file is stored in a security storage area of the local computing device, if the requested program is a program that is not designated as a secure program, and if the requested file is a file stored in a security storage area of the local computing device. In this case, when a read-only fake file is generated, a window warning window can be automatically displayed for user recognition.

In this case, the creation of new files by non-security programs may be allowed if they have non-designated extensions.

Non-Security Programs & Non-Security Storage Areas

Furthermore, in an embodiment, the data protection agent program may generate and provide in real time a fake file with read-only file attribute that can only be read if there is a request to open a file stored on the local computing device having an extension designated as secure according to the security policy, if the requested program is a program that is not designated as a secure program, and if the requested file is a file stored in a non-security storage area of the local computing device. At this time, when a fake file with a read-only file attribute is generated, a window warning can be automatically displayed for user recognition.

In this case, the creation of new files by non-security programs may be allowed if they have non-designated extensions.

It should be self-evident that a local data protection system can be developed by applying Windows' Callback File system or Linux Fuse because it works inside the operating system's recognized file system.

Furthermore, in one example, the secure storage area is a specific storage space recognized by the operating system. For example, it may be drive D, it may be a specific storage space recognized by the user such as My Documents, Desktop, etc., it may be a drive volume having the characteristics of a fixed or network drive, or it may be a drive volume having the characteristics of a removable disk.

Furthermore, in one example, when the data protection agent program monitors open requests for files stored on the local computing device that have extensions that are designated as security targets under the security policy, if computing power is low, the monitoring may be performed only within a designated area rather than monitoring the entire disk area. For example, among the recognized drives, it may be limited to a specific D: drive, or it may be limited to a user-defined folder such as My Documents, Desktop, or a designated project folder.

Furthermore, in an example of the "first case_data storage guidance function" according to an embodiment of the present invention, when MS Word is installed on a computer, MS Word is set as a secure program, only My Documents is set as a secure area, and the desktop or other storage space is not set as a secure area, a user can download a file "Internet data.doc" with the extension doc to the desktop and My Documents respectively by a web browser.

If the downloaded location is in the secure area, if you open the doc file with MS Word, a secure program, the file will be viewed as a read-write file, whereas if you open the doc file on the desktop, it will be opened as doc with read-only attributes, so when you want to modify or store (save) the file, you can only save it as a new document, and if you try to save it in a non-security area, it will not be saved.

Furthermore, according to an embodiment of the present invention, in an example of [Case 2_Data theft and loss prevention function], when the Chrome web browser, Open Word, and MS Word are installed on a computer, but only MS Word is set as a security program, only My Documents is set as a security area, and the desktop or other storage space is not set as a security area, a user can download (create) an 'Internet data.doc' file with the extension doc to the desktop and My Documents respectively by a web browser. If the downloaded location is in the secure area, the file will be read as a read-write file when opened with MS Word, a secure program, whereas if the Internet document-.doc file on the desktop is opened with MS Word, it will be opened as Internet document.doc with read-only file attributes, and if you want to modify or save the file, you will need to create a new file with a new name and can only save it as a security area. In addition, if you open the downloaded 'Internet data.doc' with Open Word, no matter where it is stored, the file is provided to Open Word as a fake file with read-only attribute and cannot be viewed.

In addition, the [third case_data leakage (insider leakage) prevention function] according to the embodiment of the present invention is the same as the second case_data theft and loss prevention function, but in addition, the Windows Explorer control, clipboard control, output control, and network control functions of the current user PC can be added.

Although the above has been described with reference to embodiments of the present invention, it will be readily understood by one having ordinary skill in the relevant technical field that various modifications and changes can be made to the present invention without departing from the ideas and scope of the present invention described in the scope of the following patent claims.

The invention claimed is:

1. A local data protection system comprising a data protection agent program installed on a local computing device that performs predetermined data protection functions in accordance with a preset security policy, wherein:

a file requested to be opened is a file stored in either a secure storage area or a non-secure storage area of the local computing device;

when there is a request to open a file stored on the local computing device having an extension designated as secure according to the security policy, the data protection agent program provides a real file that can be read and written if the file requested to be opened is a file stored in a secure storage area of the local computing device, and the data protection agent program provides a real file with a read-only file attribute that can only be read if the file requested to be opened is a file stored in a non-secure storage area of the local computing device;

a fake file of read-only file attribute is generated and provided that can only be read when the open requested file is a file stored in a secure storage area of the local computing device and the read request program is a program not stored with the security program; and the fake file has a same file size as the real file but is filled with null values or meaningless values.

2. A local data protection system comprising a data protection agent program installed on the local computing device performing predetermined data protection functions in accordance with a preset security policy, wherein:

the data protection agent program prohibits creation, modification, deletion of executable files of a secure program stored and executed on the local computing device, and prohibits copying of files from a secure storage area to a non-secure storage area, prohibits copying to the clipboard, prohibits printing output, and prohibits transferring files over a network;

a file requested to be opened is a file stored in either a secure storage area or a non-secure storage area of the local computing device;

the data protection agent program provides a real file with a read-only file attribute that is readable only if the open requested file is a file stored in a non-secure storage area of the local computing device;

when there is an open request for a file stored on the local computing device having an extension designated as secure in accordance with the security policy, and the open requested program is designated as a secure program under the security policy, the data protection agent program provides a real file with a read-only file attribute that is readable only if the open requested file is a file stored in a non-secure storage area of the local computing device; and when the open requested program is a program not designated as a secure program, the data protection agent program generates and provides in real time a fake file of read-only file attribute that can only be read when the open requested file is a file stored in a secure storage area of the local computing device; and the fake file has a same file size as the real file but is filled with null values or meaningless values.

3. A local data protection system comprising a data protection agent program installed on a local computing device that performs predetermined data protection functions in accordance with a preset security policy, wherein the data protection agent program provides a real file that is readable and writable if the open requested file is a file stored in a secure storage area of the local computing device, and the data protection agent program provides a real file with a read-only file attribute that is readable only if the open requested file is a file stored in a non-secure storage area of the local computing device, in response to an open request for a file stored on the local computing device having an extension designated as secure according to the security policy, when the open requested program is designated as a secure program according to the security policy.

* * * * *